W. C. KIRK

April 25, 1933. KNOCKDOWN CONVERTIBLE STAND Re. 18,807

Original Filed Jan. 18, 1927

INVENTOR.
WILLIAM C. KIRK.

BY Lockwood, Lockwood, Goldsmith & Galt
ATTORNEYS.

Reissued Apr. 25, 1933 Re. 18,807

UNITED STATES PATENT OFFICE

WILLIAM C. KIRK, OF INDIANAPOLIS, INDIANA

KNOCKDOWN CONVERTIBLE STAND

Original No. 1,688,546, dated October 23, 1928, Serial No. 161,788, filed January 18, 1927. Application for reissue filed October 22, 1930. Serial No. 490,519.

This invention relates to a knockdown display stand for potted plants and sprays.

One of the chief objects of the invention is to produce a stand for potted plants and sprays which when not in use for display purposes will occupy but relatively small space, and which can be readily arranged in stand formation when desired.

Another object of the invention is to provide a stand which is sectionalized, the units thereof having a detachable connection and each unit being formed for knockdown purposes.

Another object of the invention is to construct the stand in such a manner that the parts will permit of the support of a platform.

Another object of the invention is to construct a stand in such a manner that the parts while permanently connected together are arranged for knockdown positioning.

Figure 1:
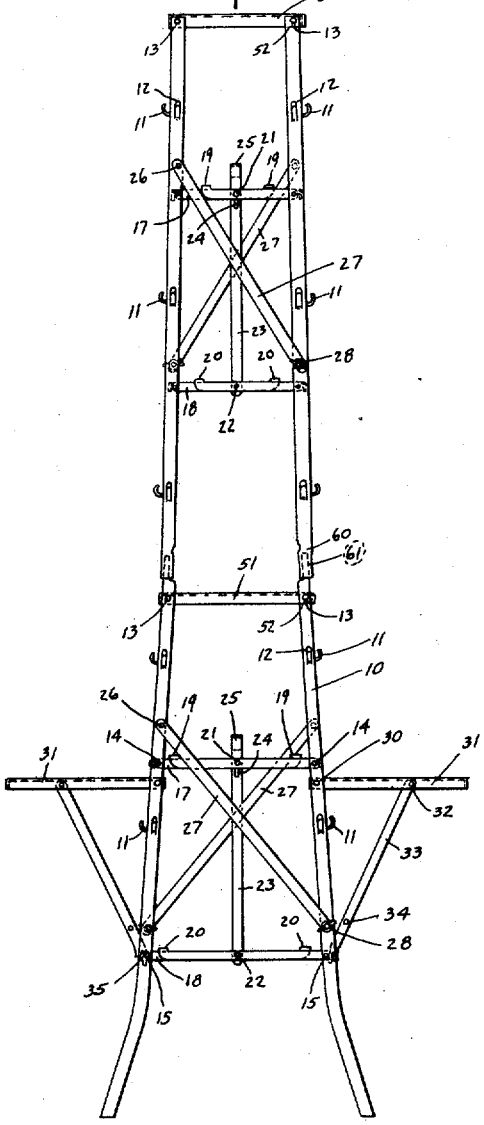
Figure 2:
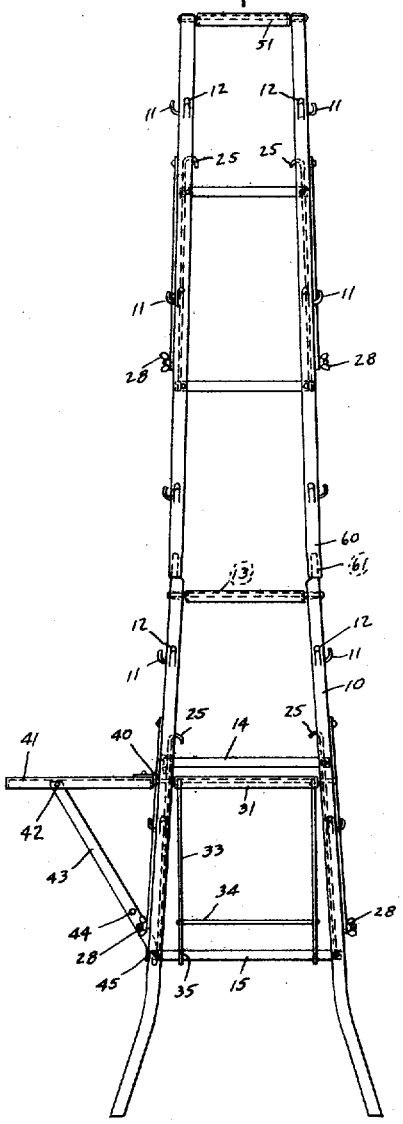

The full nature of the invention will be understood from the accompanying drawing and the following description and claims:

In the drawing Fig. 1 is a front elevational view of a two-section knockdown stand. Fig. 2 is a side elevation thereof.

In the drawing 10 indicates a channel or angle shaped leg which is inclined inwardly and upwardly. Four legs are provided and each leg at suitable intervals thereon supports a spray supporting hook 11 which herein is shown formed from, and therefore integral with the leg, as by punching or slotting 12. The legs 10 are arranged in pairs, two opposite pairs being rigidly united together by the cross members 13, 14 and 15. The two sides thus formed are connected intermediate their ends by a pair of linkages, toggle in character, the same being indicated at 17 and 18. Said linkages are pivotally supported by the transverse connections 14 and 15, respectively. The linkages 17 and 18 are provided with stop portions 19 and 20, respectively, for limiting the spreading movement. The links 17 are pivotally connected together at 21 and links 18 are pivotally connected together at 22 and a connecting bar 23 having a slot 24, is provided for simultaneously actuating the toggle linkages thus formed. Connecting bar 23 is provided with the finger piece or handle 25 for such purpose.

To secure this stand in rigid relation when in stand formation, each side pivotally supports at 26 a bracing member 27 which has a detachable connection at 28 with the other side.

Each side pivotally supports at 30 a platform 31 which at 32 pivotally supports a pair of brace members 33. Said brace members are connected together in spaced relation as at 34 and have a detachable connection at 35 with the transverse securing member 15. By elevating the platform slightly the notched ends of braces 33 can be removed from the transverse member 15 and the braces can thereupon be moved inwardly and the platform downwardly, or the braces can be moved downwardly with the downward movement of the platform so that the platform will lie in collapsed relation adjacent the side and be supported thereby. Herein two permanently connected platforms are illustrated, see Fig. 1.

In Fig. 2 a detachable platform is illustrated and the same is adapted to lie in substantially the same plane common to the two platforms 31. Herein this platform is indicated by the numeral 41 and the hooks 40 thereof are adapted to overhang the linkage 17. The platform at 42 pivotally supports a pair of frame members 43 connected by the transverse member 44 and each having at 45 a slotted end to engage the linkage 18 for bracing the platform in platform position when connected to the stand by the hooks 40 engaging the linkage connecting the sides.

A top platform 51 is herein shown at one end pivotally supported by the side forming transverse leg connecting member 13, and is shown provided at its opposite end with the slots or sockets 52 for detachable connection with the other transverse member 13. Thus, the platform 51 serves to maintain the upper end of the stand in rigid relation when in stand formation. The platform 51 is removed from its interlocking connection with the member 13 and is then swung inwardly to lie inside adjacent the side, or is swung upwardly and downwardly to lie outside adjacent the side when the stand is in collapsed relation. The collapsing and forming of the stand from and into stand formation will be readily apparent from the foregoing.

In the drawing there is illustrated a combination stand including a plurality of units and herein a pair of said units are illustrated. These are constructed substantially alike and may or may not be provided with the several platforms, that is, the platforms may be detachably or permanently connected to the sides. As heretofore described, both units are preferably collapsible into the knockdown position and herein the lower ends of the legs 10 of the upper unit are formed with sockets 60 and the upper ends of the legs 10 of the lower unit are formed with the tongues 61 so that a complementary detachable connection is obtained therebetween, whereby a combination stand is formed from a plurality of collapsible units which, when assembled together and in superposed relation, give the appearance of a continuous stand. Each unit may be separately utilized if desired.

The invention claimed is:

1. A knockdown display stand, comprising a pair of independent and self-sustaining stand units, each comprising four legs arranged in pairs, two opposite pairs being rigidly connected together for forming sides and means connecting collapsibly said paired sides together for knockdown purposes, the upper ends of the lower stand legs and the lower ends of the upper stand legs being complementary and forming a detachable connection between the units.

2. A knockdown display stand comprising upwardly directed legs arranged in pairs and permanently connected together for forming two opposite sides of the stand, a plurality of linkages connecting the same together for positioning the same in the stand-forming or knockdown positions, a platform means thereon for hooking over the linkages connecting the sides together, and other means on said platform for hooking over another adjacent linkage on the same side for supporting the platform in platform position and maintaining the sides in stand-forming relation.

3. A knockdown display stand comprising four legs, means permanently and rigidly connecting said legs together into pairs thereby forming two sides, a top pivotally supported upon one side and arranged to fold upwardly and thence outwardly and downwardly adjacent the supporting side for collapsible positioning immediately adjacent the supporting side when the adjacent side is collapsed toward the top supporting side, and a pair of oppositely positioned linkages permanently and collapsibly connecting the sides together, each linkage including a pair of links, each link thereof being pivotally connected at one end to one of the sides and extending toward the opposite side, said oppositely extending links being pivotally connected together appreciably remote from the ends and each link being permanently connected to the other side other than by the other link pivotal connection thereto.

4. A knockdown display stand comprising four legs, means permanently and rigidly connecting said legs together into pairs forming two relatively movable sides, a top supported thereby and arranged for knockdown positioning, and a pair of oppositely positioned linkages permanently and collapsibly connecting the sides together, each linkage including a pair of links, each link thereof being pivotally connected at one end to one of the sides and extending toward the opposite side, said oppositely directed links being pivotally connected together appreciably remote from the ends and each link being permanently connected to the other side other than by the other link pivotal connection thereto, said last mentioned permanent connection including a pin and slot arrangement.

In witness whereof, I have hereunto affixed my signature.

WILLIAM C. KIRK.